H. W. JUTTON.
UPRIGHT ELECTRIC TOASTER.
APPLICATION FILED OCT. 2, 1920.
1,395,345.
Patented Nov. 1, 1921.
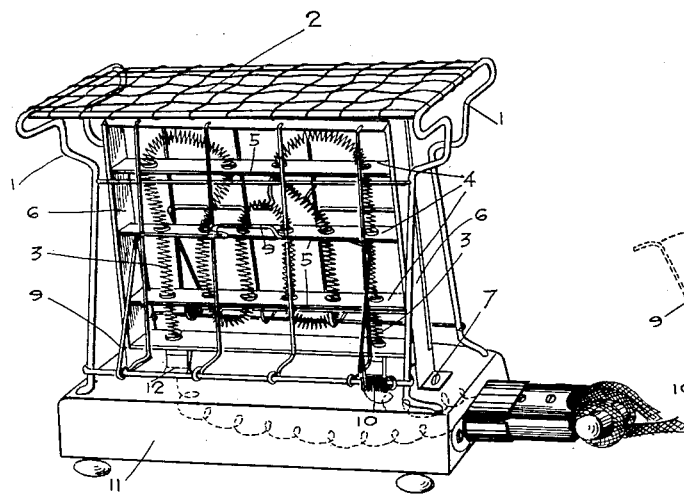
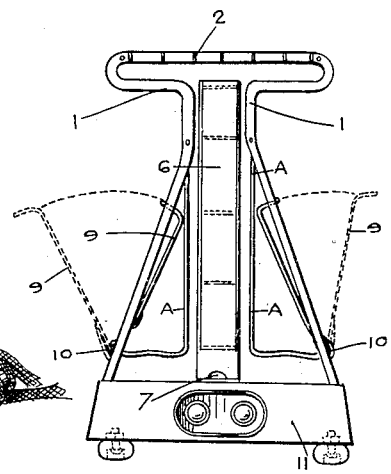
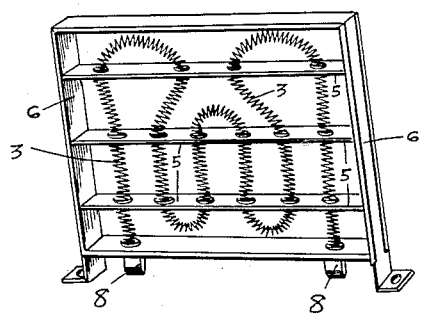
WITNESSES
INVENTOR
Henry W. Jutton
Per. A. Langford
Attorney.

UNITED STATES PATENT OFFICE.

HENRY WILLIAM JUTTON, OF HAMILTON, ONTARIO, CANADA.

UPRIGHT ELECTRIC TOASTER.

1,395,345. Specification of Letters Patent. Patented Nov. 1, 1921.

Application filed October 2, 1920. Serial No. 414,330.

*To all whom it may concern:*

Be it known that I, HENRY WILLIAM JUTTON, a citizen of Canada, residing at Hamilton, in the county of Wentworth and Province of Ontario, have invented a new and useful Improvement in Upright Electric Toasters, of which the following is a full, clear, and exact description.

My invention relates to certain useful improvements in electric toasters, consisting in, such features of novelty and combination of parts as will hereinafter be more particularly described and pointed out in the claim.

One object of my invention is to provide an electric toaster comprising a wire supporting frame and a wire top rack assembled on a suitably finished base.

Another object of my invention is to provide an electric toaster of the character referred to, with a coiled heating resistance assembled vertically and of a design to give an even distribution of heating surface.

A further object of my invention, is to provide an electric toaster of the character referred to, in which the heating element is evenly supported by insulating material strengthened by metallic strips assembled on a metal frame, said frame being independent of the main wire frame of the toaster, therefore easily renewable.

My invention has still further objects in view, all of which will be hereinafter more fully described.

Figure 1 is a view in perspective of my improved toaster, the same showing the arrangements thereof.

Fig. 2 is a vertical view of Fig. 1.

Fig. 3 is a view in perspective of the said toaster, showing the heating element and its detachable frame.

In carrying my invention into effect, it is proposed to provide an electric toaster for bread, comprising a wire supporting frame carrying a wire top rack, a wire toast support, a wire toast holder, and a coiled element, the whole assembled on a suitable base.

In order that a more complete understanding of my invention may be had, I will refer to the accompanying drawing by the figures of reference marked thereon and wherein 1, is the main frame wire onto which are assembled the other wire parts of said frame. On top of said wire frame, there is attached a wire top rack 2. A is the toast support, and 9 is the toast holder supported by a spring 10, all secured to the base 11 by means of screw nuts not shown. 3 is a coiled heating element; said element is formed of a continuous coil mounted vertically, and so disposed to describe inverted curves to give an even distribution of heat. The said element is self contained, and it is supported in mica or other insulating material 4, said insulating material being strengthened by metal strips 5 assembled in a metal frame 6.

As stated, the said metal frame 6 is independent of the toaster wire frame. It can be easily removed from the base 11 onto which it is secured, by simply taking out two screws 7 therefor, and stands complete as shown in Fig. 3.

The element terminals are so arranged that the electrical connections are made by placing the frame 6 upon the base 11. The contact pieces 8, which may be of the knife or pin type engage suitable corresponding clips 12 mounted on said base 11 thereby forming a detachable connection which allows the removal of the element without the use of any tool.

Having thus described my invention, what I claim and desire to protect by Letters Patent is:

In an upright electric toaster of the character described, a self contained element supported in mica or other insulating material and reinforced by peripheral metal strips assembled in a metal frame, said element being formed of a continuous coil mounted vertically in a frame and describing inverted curves in a vertical plane, and provided with contact pieces at each end adapted to engage terminal contacts on a base, and means for securing the frame to the base.

Hamilton, Ontario, July 14th, 1920.

HENRY WILLIAM JUTTON.

Signed in the presence of—
ANNA S. BROWN,
J. R. GRAHAM.